(12) United States Patent
Ragonetti et al.

(10) Patent No.: US 8,448,605 B2
(45) Date of Patent: May 28, 2013

(54) SMALL ANIMAL ENTERTAINMENT, EXERCISE AND INTERACTION STRUCTURE

(75) Inventors: Peter Ragonetti, Brooklyn, NY (US); Jonathan Willinger, Tenefly, NJ (US); Ryan Rutherford, Rutherford, NJ (US)

(73) Assignee: J. W. Pet Company, Inc., Teterboro, NJ (US)

( * ) Notice: Subject to any disclaimer, the term of this patent is extended or adjusted under 35 U.S.C. 154(b) by 375 days.

(21) Appl. No.: 12/695,446

(22) Filed: Jan. 28, 2010

(65) Prior Publication Data

US 2010/0206241 A1    Aug. 19, 2010

Related U.S. Application Data

(60) Provisional application No. 61/150,546, filed on Feb. 6, 2009.

(51) Int. Cl.
*A01K 29/00* (2006.01)
*A01K 1/03* (2006.01)

(52) U.S. Cl.
USPC ............................ 119/707; 119/702; 119/452

(58) Field of Classification Search
USPC ................. 119/428, 429, 431, 452, 453, 454, 119/455, 456, 459, 461, 467, 472, 473, 474, 119/475, 482, 491, 493, 496, 497, 498, 499, 119/500, 700, 702, 705, 706, 707; D30/108, D30/160, 112, 119; 482/35, 36; 446/476, 446/478; 472/62; D21/811, 814, 826
See application file for complete search history.

(56) References Cited

U.S. PATENT DOCUMENTS

| | | | | |
|---|---|---|---|---|
| 3,742,908 A * | 7/1973 | Merino | ......................... | 119/455 |
| 3,791,346 A * | 2/1974 | Willinger et al. | ............. | 119/456 |
| 3,865,082 A * | 2/1975 | Lovitz et al. | .................. | 119/452 |
| 3,994,262 A * | 11/1976 | Suchowski et al. | ........... | 119/700 |
| 4,171,682 A * | 10/1979 | Merino et al. | ................ | 119/475 |
| 4,723,512 A * | 2/1988 | Margolis | ....................... | 119/455 |
| 5,092,269 A * | 3/1992 | Phillips et al. | ................ | 119/452 |
| 5,186,122 A * | 2/1993 | Phillips et al. | ................ | 119/474 |
| 5,387,165 A * | 2/1995 | Warren | .......................... | 482/35 |
| 5,664,525 A * | 9/1997 | Phillips et al. | ................ | 119/452 |
| 6,044,799 A * | 4/2000 | Tominaga | ..................... | 119/472 |
| 6,062,171 A * | 5/2000 | Tominaga | ..................... | 119/455 |
| 6,067,939 A * | 5/2000 | Tominaga | ..................... | 119/500 |
| 6,210,247 B1 * | 4/2001 | Rodriguez Ferre | ............. | 446/99 |

* cited by examiner

*Primary Examiner* — Trinh Nguyen
(74) *Attorney, Agent, or Firm* — Eckert Seamans Cherin & Mellott, LLC

(57) ABSTRACT

A small animal structure includes several modular units slideably interconnected to form a maze and at least one end cap secured to at least one modular unit. The modular units have a common bottom edge defining an open bottom of the small animal structure. A combination of a small-animal structure and a small-animal cage includes modular units slideably interconnected to form a maze. The modular units have a common bottom edge defining an open bottom of the small-animal structure. The small-animal structure is mounted on a floor of the small animal cage.

20 Claims, 12 Drawing Sheets

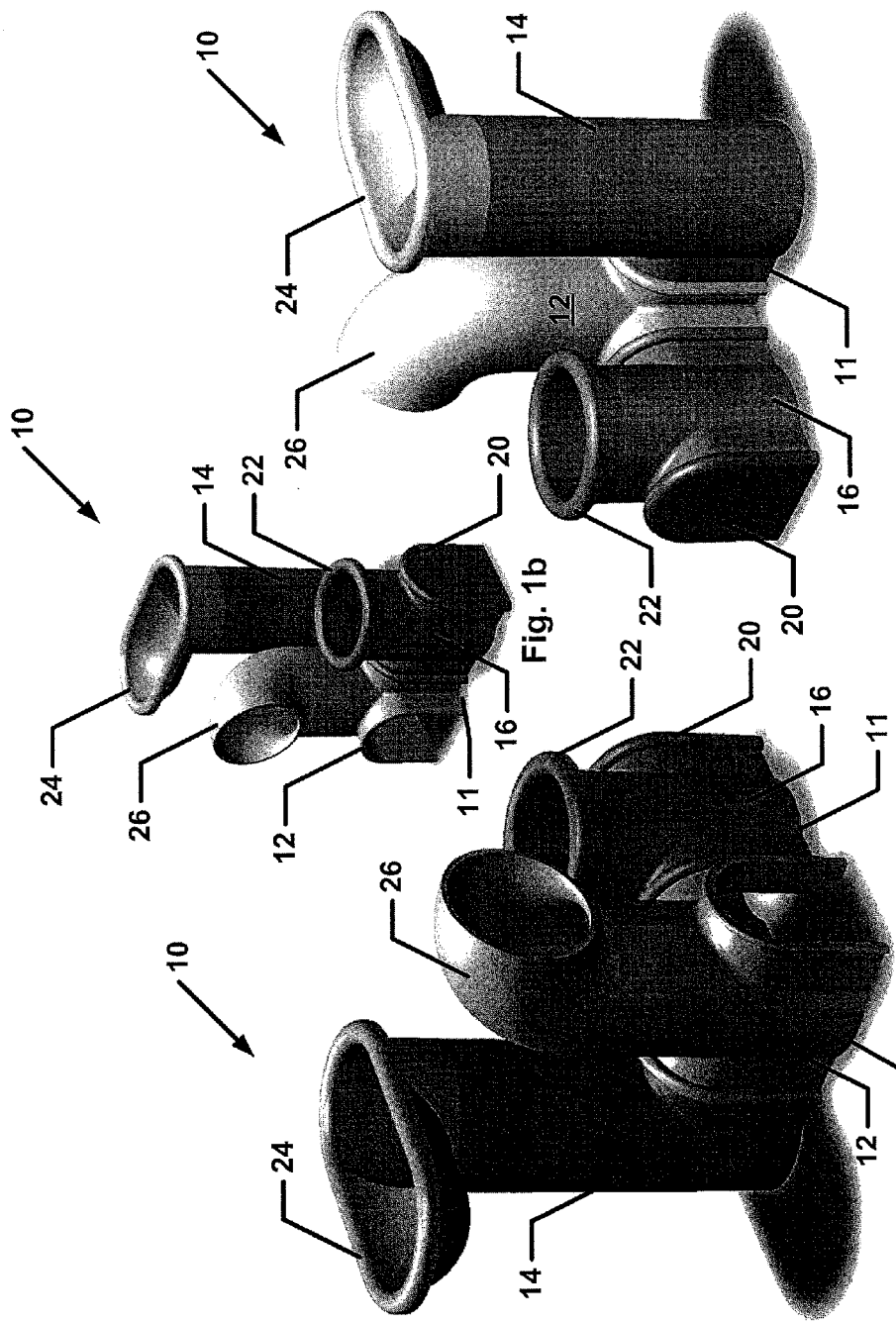

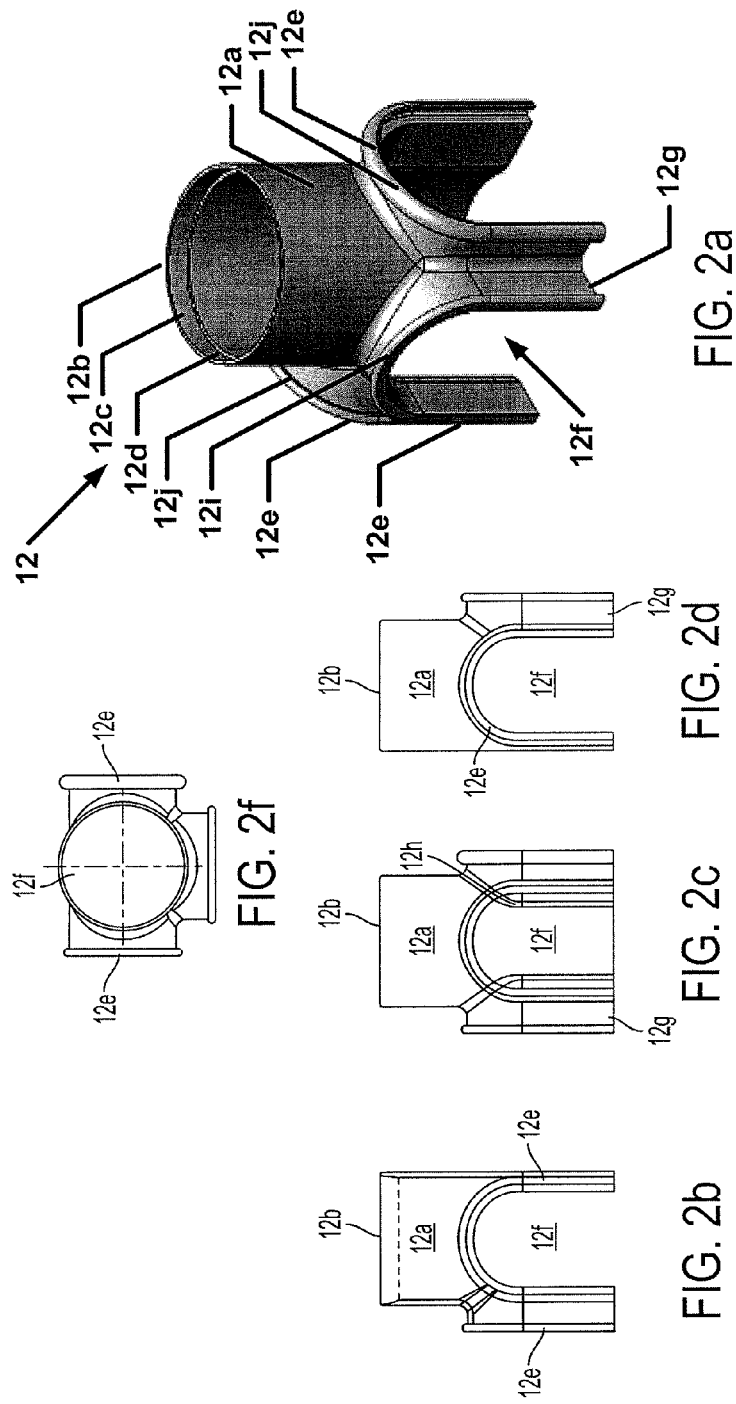

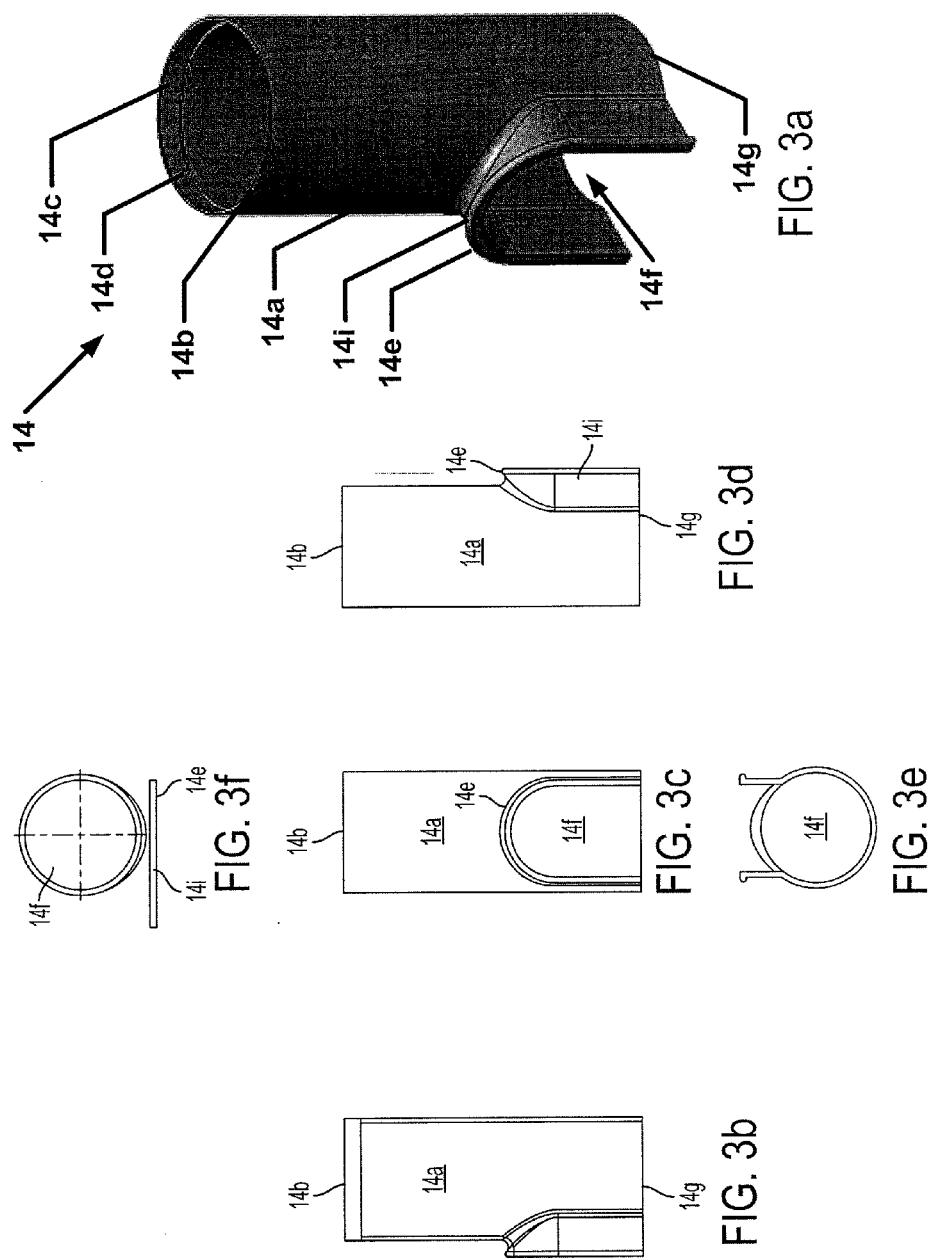

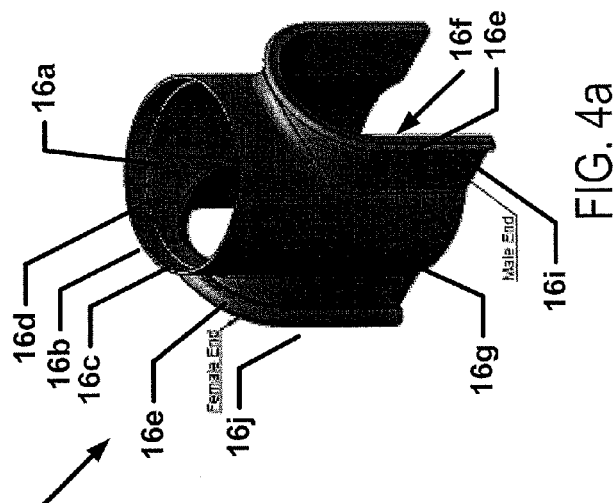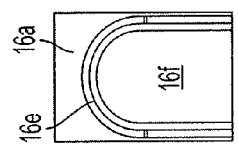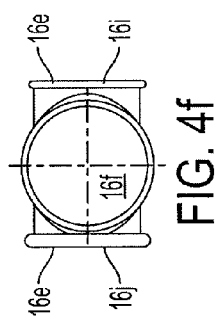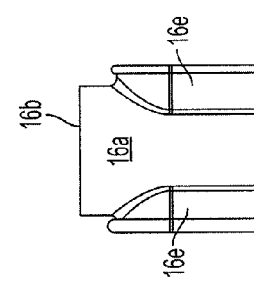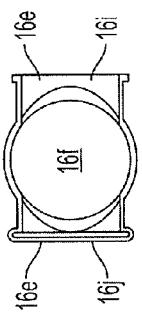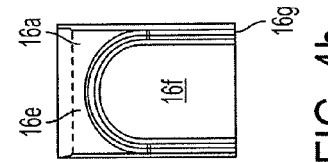

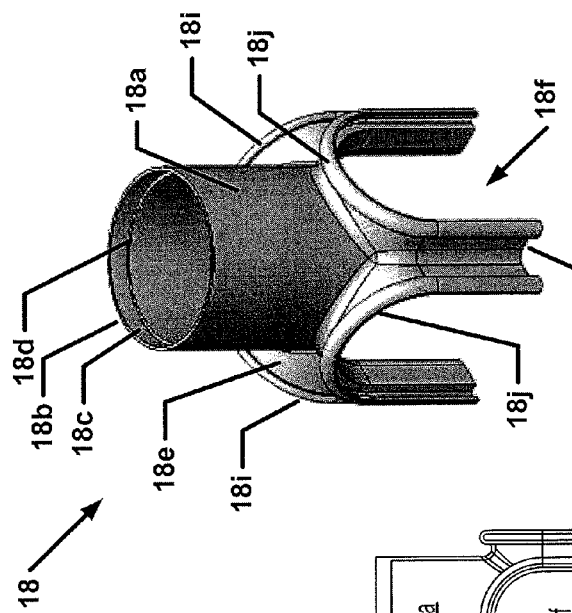
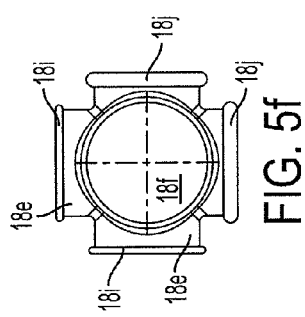
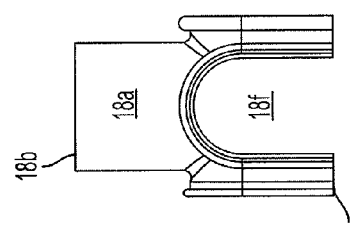
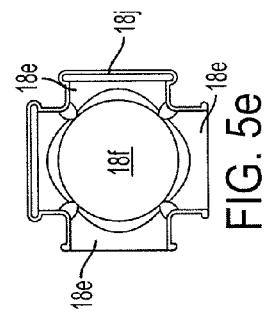
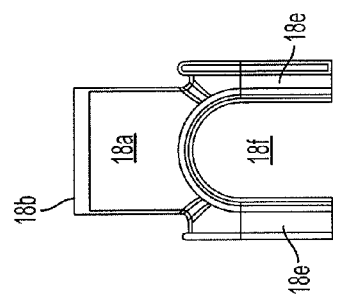

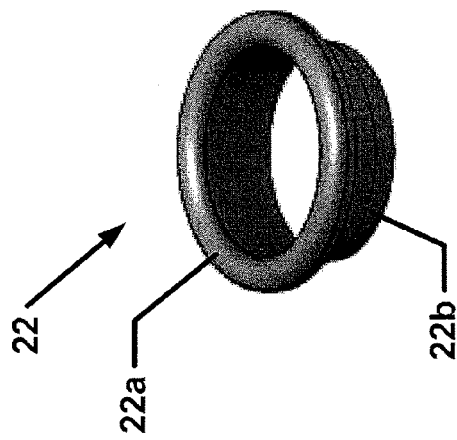
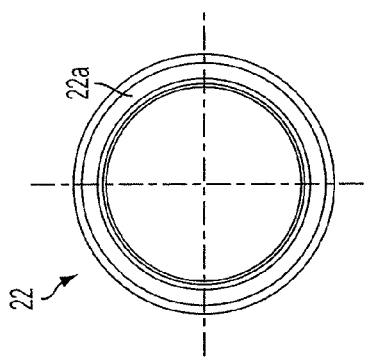
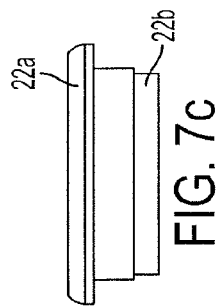
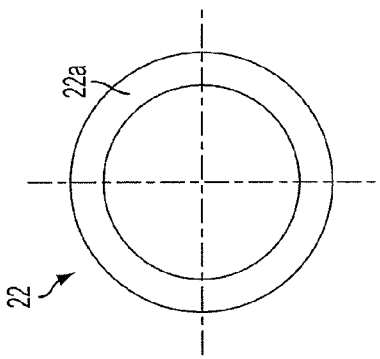
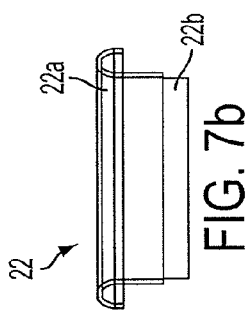

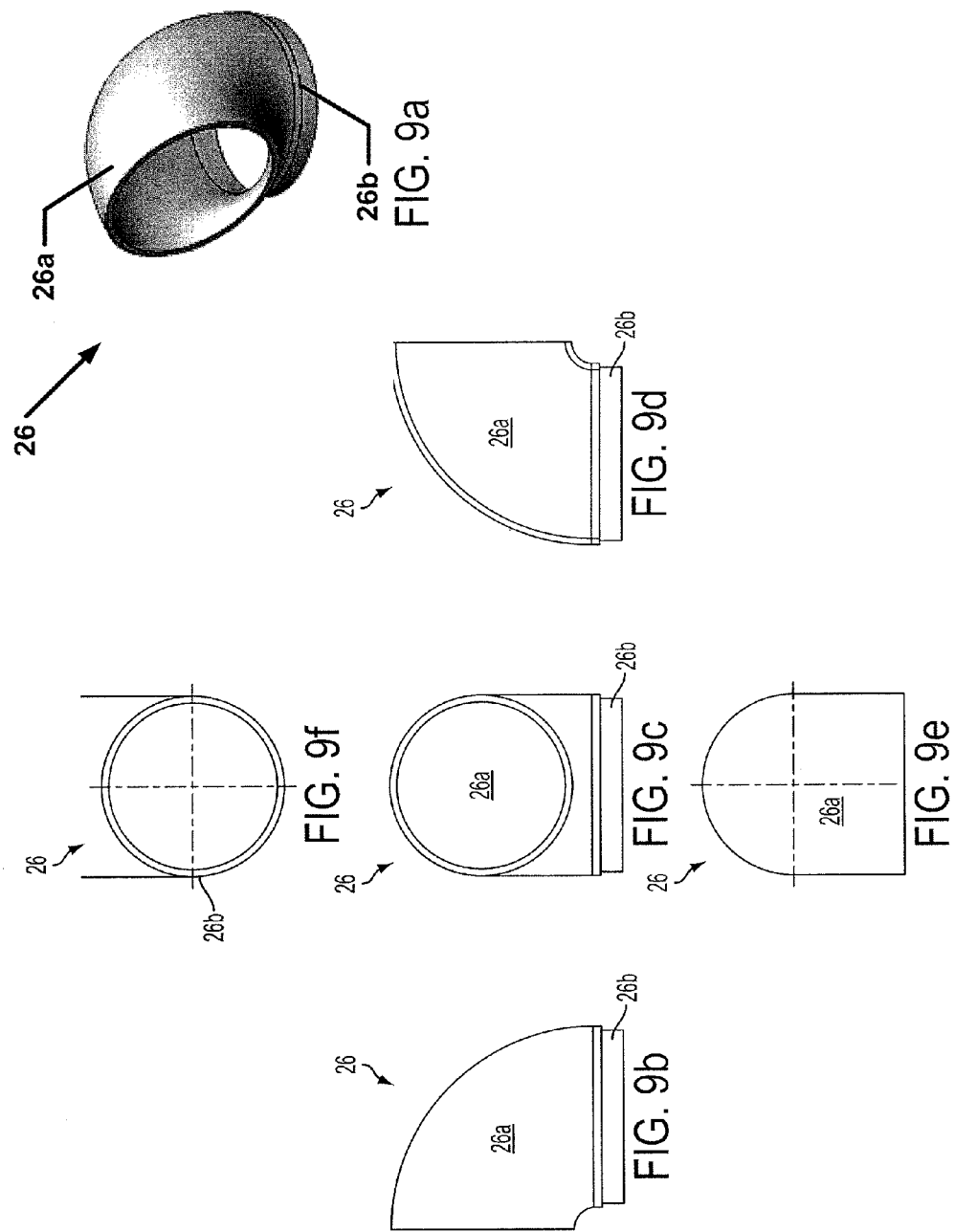

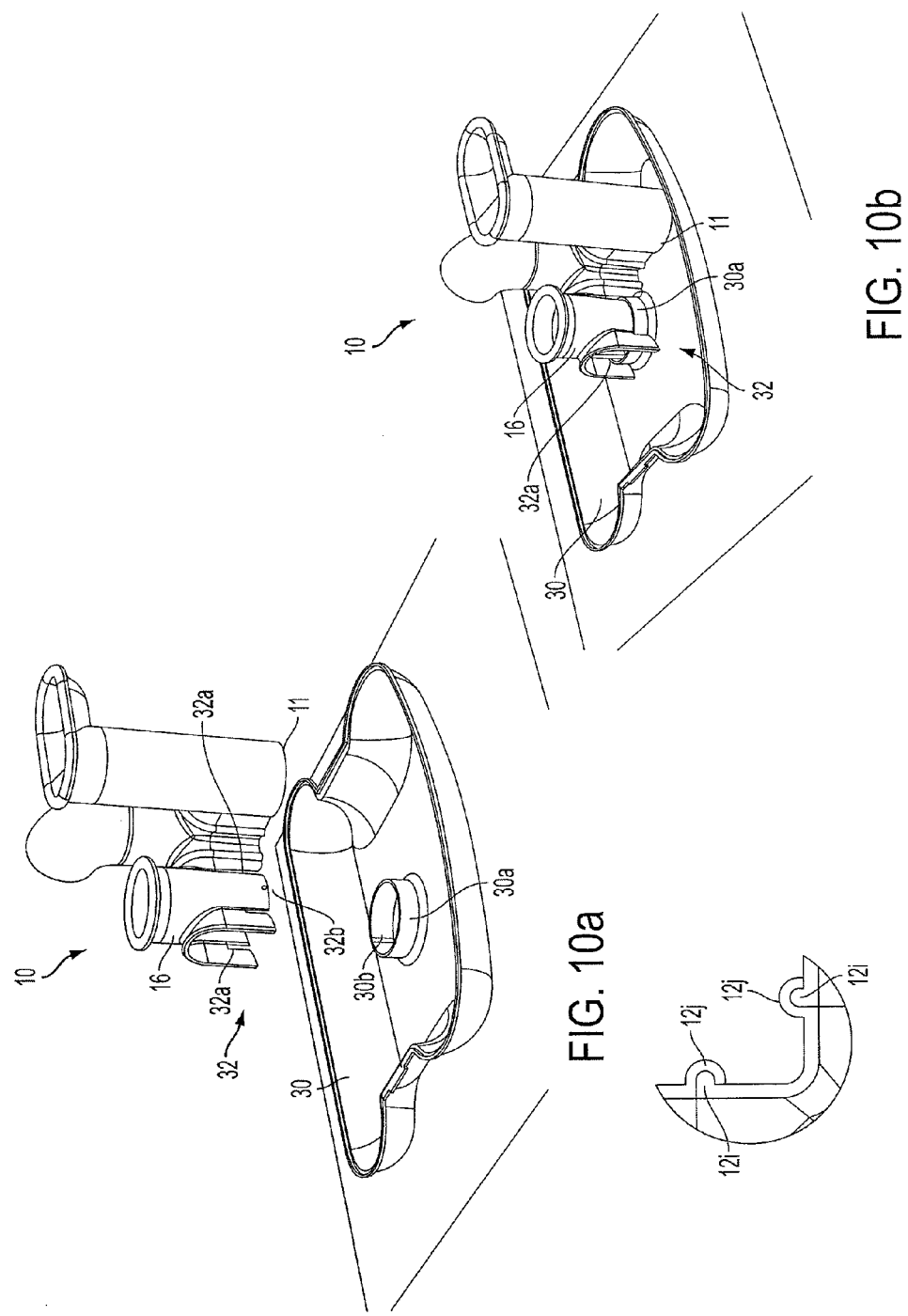

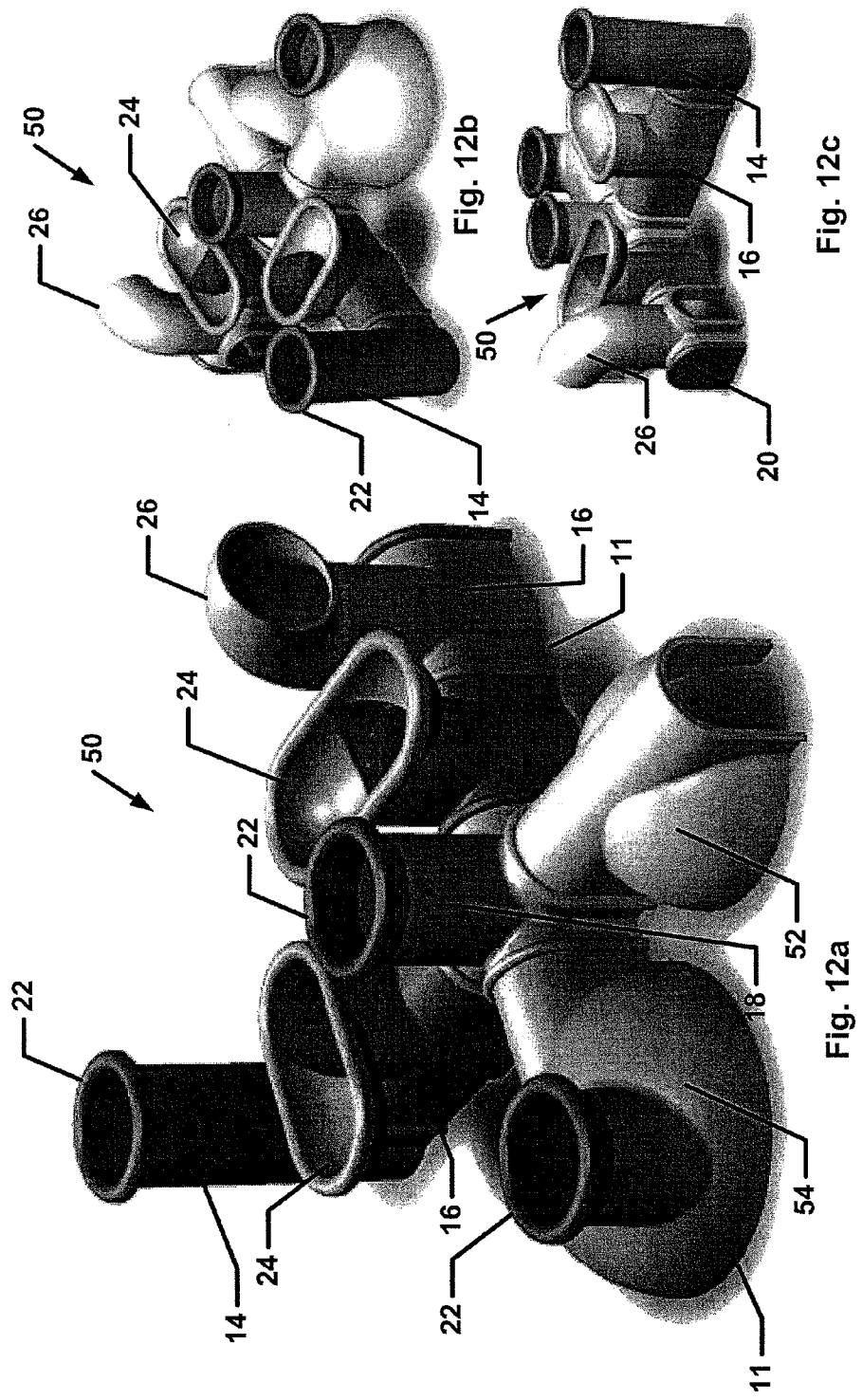

SMALL ANIMAL ENTERTAINMENT, EXERCISE AND INTERACTION STRUCTURE

CROSS-REFERENCE TO RELATED APPLICATIONS

This application is a non-provisional counterpart application to and claims priority from U.S. Ser. No. 61/150,546, which is pending and which is hereby incorporated in its entirety for all purposes by reference.

FIELD OF THE INVENTION

The invention relates to an entertainment, exercise and interaction structure for small animals.

BACKGROUND OF THE INVENTION

Small animals, such as hamsters, mice, rats of various genus, ferrets, and other small animals, in nature are naturally curious and active. These desires do not diminish when small animals are domestic pets. Owners of such pets seek to provide appropriate stimulation so that animal is able to entertain itself, has exercise, and has an opportunity to interact with the owner.

Thus, what is needed is a small animal structure for entertainment, exercise and interaction. Preferably, such a structure provides entertainment to the owner.

SUMMARY OF THE INVENTION

A small animal structure includes several modular units slideably interconnected to form a maze and at least one end cap secured to at least one modular unit. The modular units have a common bottom edge defining an open bottom of the small animal structure. A combination of a small-animal structure and a small-animal cage includes modular units slideably interconnected to form a maze. The modular units have a common bottom edge defining an open bottom of the small-animal structure. The small-animal structure is mounted on a floor of the small animal cage.

BRIEF DESCRIPTION OF THE DRAWINGS

FIG. 1a is a first perspective view of a small animal entertainment, exercise and interaction structure in accordance with one or more embodiments of the present invention.

FIG. 1b is a second perspective view of the small animal entertainment, exercise and interaction structure of FIG. 1a.

FIG. 1c is a third perspective of the small animal entertainment, exercise and interaction structure of FIGS. 1a and 1b.

FIG. 1d is an exploded view of the small animal entertainment, exercise and interaction structure as illustrated in FIG. 1a.

FIGS. 2a-2f are, respectively, a perspective, a right-side, a front, a left-side, a bottom, and a top view of a triple-entrance tube unit.

FIGS. 3a-3f are, respectively, a perspective, a right-side, a front, a left-side, a bottom, and a top view of a single-entrance tube unit.

FIGS. 4a-4f are, respectively, a perspective, a right-side, a front, a left-side, a bottom, and a top view of a double-entrance tube unit.

FIGS. 5a-5f are, respectively, a perspective, a right-side, a front, a left-side, a bottom, and a top view of a quadruple-entrance tube unit.

FIGS. 7a-7e are, respectively, a perspective, a cross-sectional, front, top and bottom view of a ring end cap.

FIGS. 9a-9f are, respectively, a perspective, a right-side, a front, a cross-sectional, a top, and a bottom view of a pipe end cap.

FIG. 10a is a perspective view of a small animal structure prior to mounting in a base unit of a cage in accordance with one or more embodiments of the present invention.

FIG. 10b is a perspective view of the small animal structure of FIG. 10a mounted in the base unit of a cage.

FIG. 11 is cross-sectional view of interconnecting portions that join one or more modular units together in accordance with one or more embodiments of the present invention.

FIG. 12a is a first perspective view of a small animal entertainment, exercise and interaction structure in accordance with one or more embodiments of the present invention.

FIG. 12b is a second perspective view of the small animal entertainment, exercise and interaction structure of FIG. 12a.

FIG. 12c is a third perspective of the small animal entertainment, exercise and interaction structure of FIGS. 12a and 12b.

DETAILED DESCRIPTION OF THE INVENTION

Figure 1D:
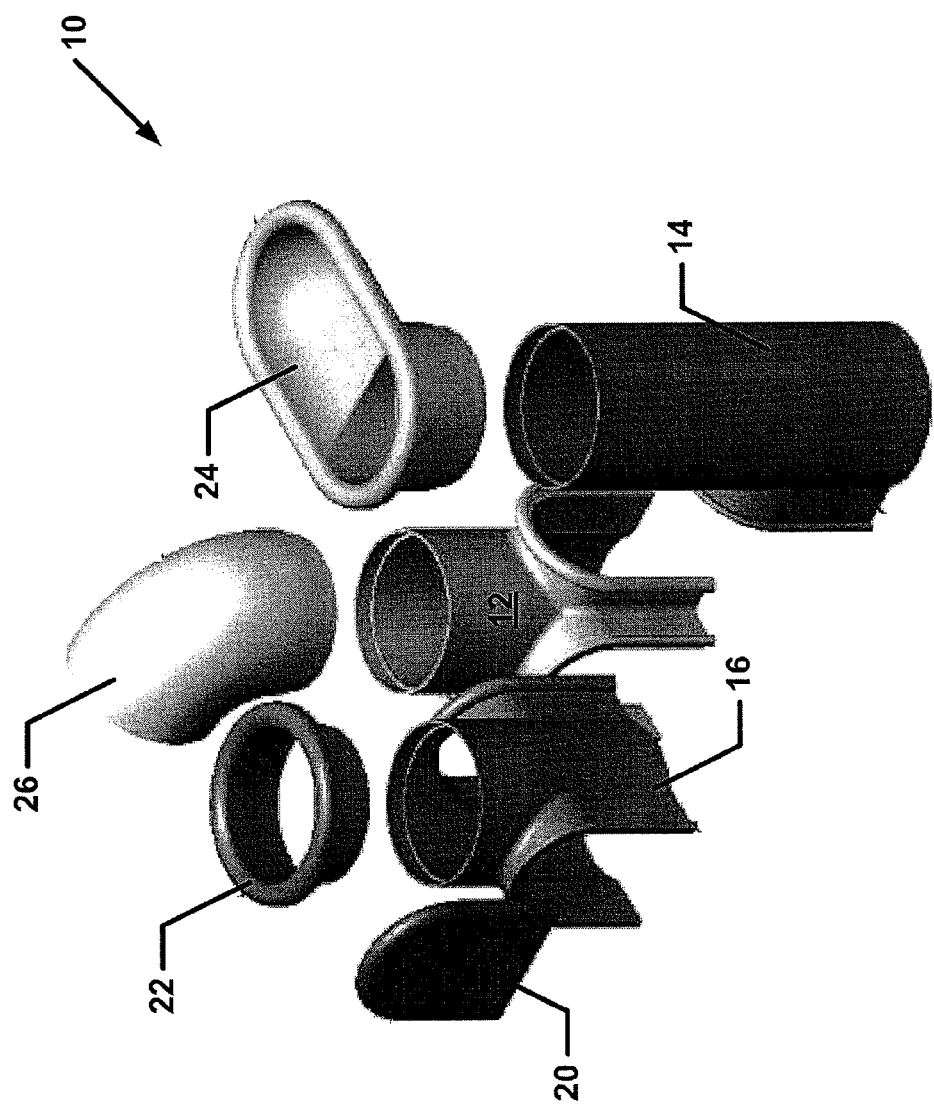
Figure 6A:
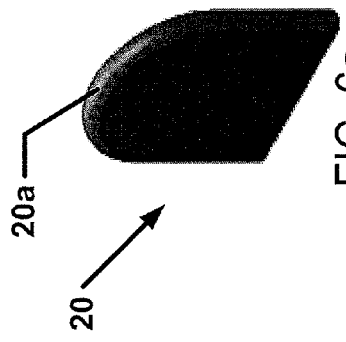
FIGS. 6a-6g are, respectively, a perspective, a right-side, a front, a left-side, a rear, a top, and a bottom view of an end cover.
Figure 6E:
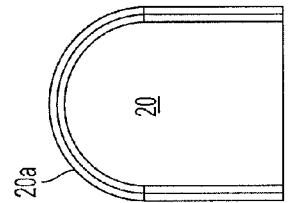
Figure 6D:
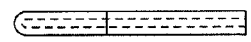
Figure 6G:
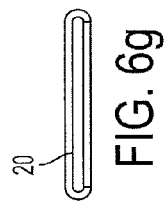
Figure 6C:
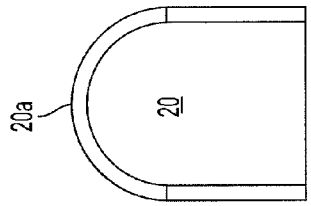
Figure 6F:
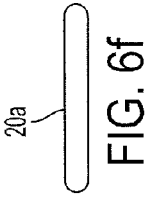
Figure 6B:
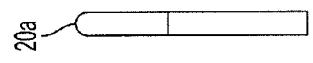
Figure 8A:
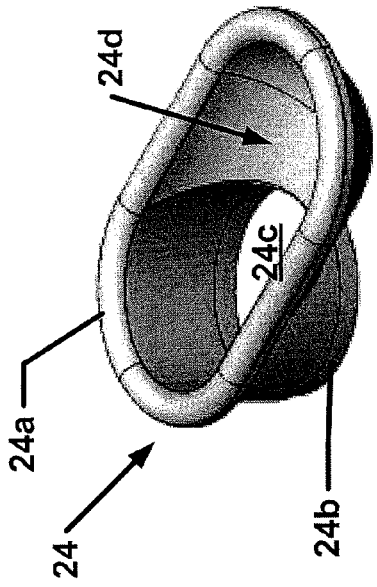
FIGS. 8a-8f are, respectively, a perspective, a front, a right-side, a cross-sectional, a top, and a bottom view of a platform cap.
Figure 8D:
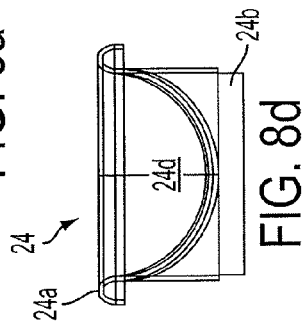
Figure 8F:
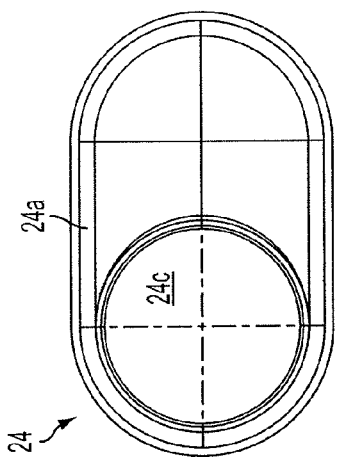
Figure 8C:
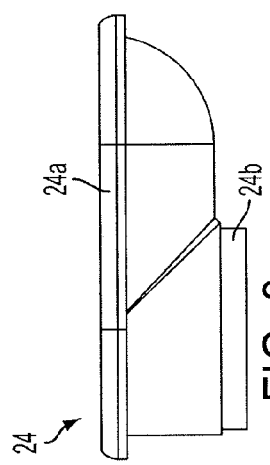
Figure 8E:
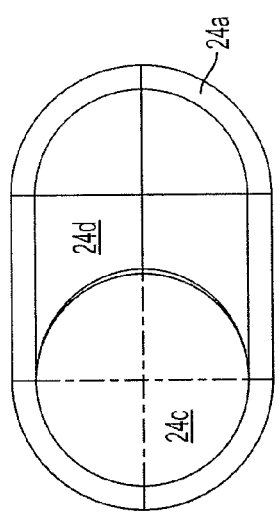
Figure 8B:
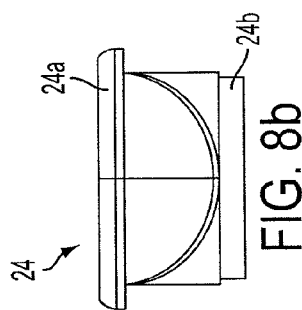

FIG. 1a is a first perspective view of a small animal entertainment, exercise and interaction structure in accordance with one or more embodiments of the present invention. FIG. 1b is a second perspective view of the small animal entertainment, exercise and interaction structure of FIG. 1a. FIG. 1c is a third perspective of the small animal entertainment, exercise and interaction structure of FIGS. 1a and 1b. FIG. 1d is an exploded view of the small animal entertainment, exercise and interaction structure as illustrated in FIG. 1a.

In accordance with one or more embodiments of the present invention, a small animal entertainment, exercise and interaction structure 10, i.e., a small animal structure 10, includes a plurality of modular structural units that may be selectively arranged by a small animal owner.

The small animal structure is suitable for small animals, such as hamsters, mice, rats of various genus, ferrets, and other small animals (collectively and singularly "small animal") that are customarily or, even if not customary can be kept in cages, terrariums, aquariums, or like structures, (collectively and singularly "cage"). The small animal structure may be permanently or temporarily secured in a cage having a securing unit in accordance with one or more embodiments of the present invention or may simply be positioned in a cage in accordance with other embodiments of the present invention.

Small animal structure 10 includes a plurality of modular units 12-18 and end caps 20-26 that provide an entertaining and exploratory maze for a resident small animal. The maze is configured as a convoluted structure mimicking in the abstract the tunnels and opening therein that some small animals make in nature. End cap units provided at distal ends of at least some modular units permit an opportunity for the owner to interact with the resident small animal as the animal peeks from the structure.

Each of the plurality of modular units has an open bottom and the plurality of modular units has a common bottom edge 11 when joined together defining an open bottom of the small-animal structure wherein the modular units rest on a surface such as a floor of the cage. This open bottom surface lies in a common plane as can be seen at least in FIGS. 1a, 1b, 1c, the open bottom surface advantageously permits the small animal structure to be raised from the cage floor for easy cleaning of the cage floor area covered by the small animal structure. Since a closed floor of an animal structure would obstruct the interior, the open floor, i.e., lack of a floor, advantageously permits easy cleaning of the small animal structure itself.

In general, small animal structure 10 is configured such that the modular units may be interconnected via a connecting portion on one unit that is slideably engageable with a connecting portion on at least one other modular unit. Other connections are also foreseen. For example, the interconnected portions may rather than have male or female connection have pressure fitted connections or friction fit connections.

Recessed bands provided on end caps may mate with indented bands provided on distal ends of the modular units and secure the end caps to the modular units. To aid in the mating of the end caps with the modular units and to help orient the end caps relative to the respective modular unit, the indented bands on the modular units may include one or more slots into which a respective key, e.g., raised portion, provided on the recessed bands of the end cap fits. It should be appreciated that the reverse arrangement of keys provided on the indented bands of modular units and slots in the recessed bands of the respective end cap also orients the end caps relative to the respective modular unit and mates therewith.

The exemplary small animal structure of FIGS. 1a-1d includes a center modular unit configured as a tube unit 12, herein configured as a triple-entrance tube unit. FIGS. 2a-2f are, respectively, a perspective, a right-side, a front, a left-side, a bottom, and a top view of a triple-entrance tube unit. The triple-entrance tube unit comprises a circumferential wall 12a having an edge 12b of a tube. The height of the wall may be any suitable height and the tube unit may have any suitable dimensions. An indented band 12c having an edge 12d is provided on the inside of wall 12a for securing an extension or cap unit.

Tube unit 12 further includes a plurality of protruding arched doorways or entrance portions 12e that with wall 12a define the limit of an inner space 12f. The entrance portions are open to a bottom and have a common bottom edge 12g that rests on a surface such as the floor of a cage. Therein, the entrance portions provide a vaulted architectural look.

Two entrance portions may be, but not necessarily, disposed along a common axis passing through the entrance openings and form a straight common passageway through the inner space. One entrance portion is disposed perpendicular to the other two and forms an intersecting passageway relative to the common passageway. The entrance portions may have a rearwardly located edge 12h disposed in inner space 12f.

At each entrance portion, an interconnecting portion may be formed. This may be in the shape of a peripheral lip 12i that defines a male interconnecting portion and a hook-shaped or c-shaped, in cross-section, peripheral receiving section 12j that defines a female interconnecting portion. FIG. 11 is cross-sectional view of interconnecting portions that join one or more modular units together in accordance with one or more embodiments of the present invention.

Therein, it is preferred that the entrance portions that form a common passageway comprise female interconnecting portions 12j, and the entrance portion forming an intersecting passageway comprises a male interconnecting portion 12i.

A tube unit 14, which may be configured as a single-entrance tube unit, is connected to tube unit 12. FIGS. 3a-3f are, respectively, a perspective, a right-side, a front, a left-side, a bottom, and a top view of a single-entrance tube unit. The single-entrance tube unit comprises a circumferential wall 14a having an edge 14b of a tube. An indented band 14c having an edge 14d is provided on the inside of wall 14a for securing an extension or cap unit. The height of wall 14a may be any suitable height and the tube unit may have any suitable dimensions. However, wall 14a may be substantially different in height, for example, taller, than wall 12a.

Tube unit 14 further includes one protruding arched doorway or entrance portion 14e that with wall 14a define the limit of an inner space 14f. The entrance portion is open to a bottom and along with wall 14a defines a common bottom edge 14g that rests on a surface such as the floor of a cage. Therein, the entrance portion may provide a vaulted architectural look.

A male interconnecting portion 14i or a female interconnecting portion may be formed at the entrance portion that are substantially similar to peripheral lip 12i (as illustrated) or similar to peripheral receiving section 12j (not illustrated), respectively.

A tube unit 16, which may be configured as a double-entrance tube unit, is connected to tube unit 12. FIGS. 4a-4f are, respectively, a perspective, a right-side, a front, a left-side, a bottom, and a top view of a double-entrance tube unit. The double-entrance tube unit comprises a circumferential wall 16a having an edge 16b of a tube. An indented band 16c having an edge 16d is provided on the inside of wall 16a for securing an extension or cap unit. The height of wall 16a may be any suitable height and the tube unit may have any suitable dimensions.

Tube unit 16 further includes a plurality of protruding arched doorways or entrance portions 16e that with wall 16a define the limit of an inner space 16f. The entrance portions are open to a bottom and along with wall 16a define a common bottom edge 16g that rests on a surface such as the floor of a cage. Therein, the entrance portions provide a vaulted architectural look.

The entrance portions may be, but not necessarily, disposed along a common axis passing through the entrance openings and form a straight common passageway through the inner space.

A male interconnecting portion 16i or a female interconnecting portion 16j may be formed at each entrance portion and are substantially similar to peripheral lip 12i or similar to peripheral receiving section 12j, respectively. Therein, it is preferred that one entrance portion has a female interconnecting portions 16j at one entrance portion and the other entrance portion has a male interconnecting portion 16i.

Small animal structure 10 may also include a tube unit 18 configured as quadruple-entrance tube unit which may be secured to other tube units. FIGS. 5a-5f are, respectively, a perspective, a right-side, a front, a left-side, a bottom, and a top view of a quadruple-entrance tube unit. The quadruple-entrance tube unit comprises a circumferential wall 18a having an edge 18b of a tube. An indented band 18c having an edge 18d is provided on the inside of wall 18a for securing an extension or cap unit. The height of wall 18a may be any suitable height and the tube unit may have any suitable dimensions.

Tube unit 18 further includes four protruding arched doorways or entrance portions 18e that with wall 18a define the limit of an inner space 18f. The entrance portions are open to a bottom and have a common bottom edge 18g that rests on a surface such as the floor of a cage. Therein, the entrance portions provide a vaulted architectural look.

Two of the four entrance portions may be, but not necessarily, disposed along a common axis passing through the entrance openings and form a straight common passageway through the inner space that intersects the other two entrance portions that may be, but not necessarily, disposed along a common axis passing through the entrance openings and form a second straight common passageway through the inner space.

A male interconnecting portion 18i or a female interconnecting portion 18j may be formed at each entrance portion and are substantially similar to peripheral lip 12i or similar to peripheral receiving section 12j, respectively. Therein, it is preferred that one entrance portion of each pair forming a common passage way has a female interconnecting portion 18j at one entrance portion and the other entrance portion has a male interconnecting portion 18i.

A plurality of end cap units may be operable secured to modular units 12-18 to provide a finished appearance the modular units and permit the resident small animal to climb explore and entertain themselves. FIGS. 6a-6f are, respectively, a perspective, a right-side, a front, a left-side, a rear, a top, and a bottom view of an end cover. Therein, an end cover 20 is configured substantially planar. An edge 20a is preferably shaped to have a protruding peripheral lip substantially similar to lip 12i such that edge 20a mates with the female interconnecting portion to seal the respective entrance portion off. The end cover mimics in the abstract non-functional or collapsed tunnel portions that the resident small animal may be required to consider in nature.

FIGS. 7a-7e are, respectively, a perspective, a cross-sectional, a front, a top, and a bottom view of a ring end cap. A ring end cap 22 formed as an annulus comprises a rounded peripheral edge 22a at one end and a recessed band 22b at another end. Therein, the recessed band is configured to mate with indented bands 12c, 14c, 16c, and 18c to provide structural support to edge 12b, 14b, 16b, and 18b. The peripheral edge may have a c-shape with an undercut in order to permit the resident small animal to use the lip as a climbing aid. The ring end cap mimics in the abstract a burrow opening that the resident small animal may instinctually create in nature.

FIGS. 8a-8f are, respectively, a perspective, a front, a right-side, a cross-sectional, a top, and a bottom view of a platform cap. A platform cap 24 formed having a bathtub shape with a depression comprises a rounded peripheral edge 24a at one end and a recessed band 24b at another end. Therein, the recessed band is configured to mate with indented bands 12c, 14c, 16c, and 18c to provide structural support to edge 12b, 14b, 16b, and 18b. An opening 24c leads to the depression 24d, where the resident small animal can rest in a protected position that mimics in the abstract a predator-safe ground position.

FIGS. 9a-9f are, respectively, a perspective, a right-side, a front, a cross-sectional, a top, and a bottom view of a pipe end cap. A pipe end cap 26 may be formed as a quarter pipe section 26a at one end and a recessed band 26b at another end. Therein, the recessed band is configured to mate with indented bands 12c, 14c, 16c, and 18c to provide structural support to edge 12b, 14b, 16b, and 18b. The pipe end cap mimics in the abstract an opening provided in a vertically-oriented surface, such as a cliff, that the resident small animal may instinctually create in nature.

FIG. 10a is a perspective view of a small animal structure prior to mounting in a base unit of a cage in accordance with one or more embodiments of the present invention. FIG. 10b is a perspective view of the small animal structure of FIG. 10a mounted in the base unit of a cage. In use, small animal structure 10 may be mounted in a cage (such as the one disclosed in U.S. Patent Publication 20080230012, which is hereby incorporated by reference for all purposes) having a base unit 30. Preferably, the base unit comprises a securing unit 30a, which may be configured as an upright annular structure raised from the base unit. However, other configurations may be used.

In at least one modular unit, such as here illustrated with respect to double-entrance tube unit 16, a plurality of interlocking features 32 is present. For example, the interlocking features may comprise slots 32a positioned to have a wall portion of the securing unit fit into one or more slots 32. Index keys 32b may also be present and would orient in one or more slots 30b provided in the securing unit. In particular, a combination of slots 32a, index keys 32b cooperative with slots 30b provides an efficient securing and mounting structure. Moreover, it is preferable that securing unit 30a comprises a shape sized to receive a structural component of a modular unit 12-18, as for example, wall 16a near the bottom edge.

An interlocking feature need not be present on small animal structure 10 when not used in a cage or when freestanding.

Once small animal structure 10 is set-up either in a cage or free-standing, the resident small animal may find entertainment and exercise by traversing through the maze formed by the modular units. When so desired the animal can climb out via the end caps or exit through the doorways. The end caps provide an opportunity for the resident small animal to be raised from the base of a cage and for the owner, e.g., owner, to more easily reach for and interact with the animal.

Each of the end caps may provide a different experience for the small animal. The ring end cap may be used to climb straight out of a vertical tube; the platform cap permits the animal to hide in the depression and observe; and the pipe end cap permits a vertical to horizontal upward climb. Each of these when combined with the variations possible in establishing a maze comprised of modular units 12-18 provides for an ever-changing small animal entertainment, exercise and interaction structure.

FIG. 12a is a first perspective view of a small animal entertainment, exercise and interaction structure in accordance with one or more embodiments of the present invention. FIG. 12b is a second perspective view of the small animal entertainment, exercise and interaction structure of FIG. 12a. FIG. 12c is a third perspective of the small animal entertainment, exercise and interaction structure of FIGS. 12a and 12b. Therein, a small animal entertainment, exercise and interaction structure, e.g., small animal structure 50, is similar to small animal structure 10, but is significantly larger and more complex by the use of multiple use of the same modular component, for example, double-entrance tube 16, and/or multiple use of the same end cap, for example, platform end cap 26.

However, additional types of modular units may be also be used. For example, large units having five or more entrances, e.g., doorway may be contemplated. Therein, a modular unit 52 is configured as a tunnel having a central expanded space or a modular unit 54 is configured as an enlarged space with a vertically extending opening.

The small animal structure 10 or 50 may comprise any suitable material, but preferably provides an interesting visual appearance. Thus, it is preferred that the modular units comprise materials such as transparent plastic material, e.g., transparent general purpose styrene plastic, so that the owner can watch the resident small animal in the small animal structure. The end caps are preferred to be in opaque plastic, e.g., opaque polypropelene plastic. Each modular unit and/or end cap may be colored and the use of different colors would provide an amusing choice to a small animal pet owner configuring the small animal structure according to their taste. In particular, plastic is preferred material for the present invention because it is easily cleanable, affordable, easy to use in manufacturing, and has reduced shipping weight. Transparent plastic is preferably used as a safety feature to see if the resident small animal has not become stuck.

In accordance with one or more embodiments of the present invention, small animal structures 10 or 50 may be molded out of fewer units or just one unit. Therein, multiple modular units may be combined integrally as fewer unit and may include one or more integrally molded end caps. For example, small animal structure 10 may comprise a single structure including the end caps.

In accordance with one or more embodiments of the present invention, tube walls 12*a*, 14*a*, 16*a*, and 18*a* have a diameter at respective edge 12*b*, 14*b*, 16*b*, and 18*b* of 2 inches and each doorway, e.g., entrance, 12*e*, 14*e*, 16*e*, and 18*e* may have a width of 1.5 inches and a height of 2.25 inches to center (maximal) height of the arch. However, other sizes are contemplated for the structure.

Moreover, arched entrance openings may also have a different non-arched or different arched shape.

It should be appreciated that the present invention may be adapted to provide an entertainment, exercise and interaction structure for snakes by being sized differently and having the disclosed structures altered to minimize angles, reduce dimensions, and provide texturing as may be suitable for the particular genus of snake. Similarly, while the present invention is suitable for ferrets, increasing dimensions and providing particular angles provides a more enjoyable experience by the resident small animal.

While the invention has been described in conjunction with specific embodiments, it is to be understood that many alternatives, modifications, and variations will be apparent to those skilled in the art in light of the foregoing description.

What is claimed is:

1. A small-animal structure comprising:
   a plurality of modular units comprising a bottom edge common to all modular units and defining an open bottom of the small-animal structure along a common plane;
   each modular unit comprising at least one entrance disposed in a plane perpendicular to the common bottom edge, the entrance of one modular unit slideably connected to the entrance of at least one other modular unit so that the plurality of modular units are slideably interconnected to form a maze;
   at least one modular unit comprising an upwardly extending circumferential wall, the wall having an upper edge parallel to the common bottom edge, and
   at least one end cap secured to at least one modular unit.

2. The small-animal structure of claim 1, wherein each of the at least one end cap comprises a recessed band and the at least one modular unit comprises an indented band for mating with the recessed band.

3. The small-animal structure of claim 1, wherein a first of the plurality of modular units comprises a first entrance comprising a peripheral lip and a second entrance comprising a receiving section.

4. The small-animal structure of claim 3, wherein a second of the plurality of modular units comprises a third entrance comprising a peripheral lip or a receiving section, the third entrance for slideably interconnecting with the first or second entrance.

5. The small-animal structure of claim 1, wherein the at least one entrance of each modular unit comprises an arch open to the bottom of the small-animal structure.

6. The small-animal structure of claim 1, further comprising an end cover for closing an entrance of one of the plurality of modular units.

7. The small-animal structure of claim 1, wherein the plurality of modular units comprises a double-entrance tube unit, a triple-entrance tube unit, or a quadruple-entrance tube unit.

8. The small-animal structure of claim 1, wherein the plurality of modular units comprises a vertical tube.

9. The small animal structure of claim 1, wherein the at least one end cap comprises a quarter pipe, a platform bathtub, or a ring.

10. The small animal structure of claim 1, wherein one of the plurality of modular units comprises transparent plastic material.

11. A small-animal structure comprising:
    a plurality of interconnected modular units forming a maze and having a bottom edge common to all modular units and defining an open bottom of the small-animal structure,
    each modular unit comprising at least one entrance, the at least one entrance being perpendicular to the common bottom edge and open to the bottom of the small-animal structure,
    each modular unit having at least one entrance of one modular unit slideably interconnected to the at least one entrance of another modular unit; and
    at least one modular unit comprising an upwardly extending circumferential wall, the wall having an upper edge parallel to the common bottom edge.

12. The small-animal structure of claim 11, further comprising an end cap and one of the modular units comprising an upright member, the end cap joined to the upright member.

13. The small-animal structure of claim 11, wherein a first of the plurality of modular units comprises a first entrance comprising a peripheral lip and a second entrance comprising a receiving section.

14. The small-animal structure of claim 13, wherein a second of the plurality of modular units comprises a third entrance comprising a peripheral lip or a receiving section, the third entrance for slideably interconnecting with the first or second entrance.

15. The small-animal structure of claim 11, further comprising an end cover for closing one entrance.

16. A small-animal structure comprising:
    a plurality of interconnected modular units;
    each modular unit having a bottom edge, the bottom edges of each unit defining an open bottom of the small-animal structure along a common plane,
    each modular unit comprising at least one entrance, the at least one entrance being perpendicular to the common bottom edge and open to the bottom of the small-animal structure,
    each modular unit having at least one entrance of one modular unit slideably interconnected to the at least one entrance of another modular unit; and
    at least one modular unit comprising an upwardly extending circumferential wall, the wall having an upper edge parallel to the common bottom edge.

17. The small-animal structure of claim 16, wherein a first of the plurality of modular units comprises a first entrance comprising a peripheral lip and a second entrance comprising a receiving section.

18. The small-animal structure of claim 17, wherein a second of the plurality of modular units comprises a third entrance comprising a peripheral lip or a receiving section, the third entrance for slideably interconnecting with the first or second entrance.

19. The small-animal structure of claim 16, further comprising an end cover for closing one entrance.

20. The small animal structure of claim 16, wherein one of the modular units comprises an upright member.

\* \* \* \* \*